(No Model.)  6 Sheets—Sheet 1.

A. B. LANDIS.
GRINDING MACHINE.

No. 427,091.  Patented May 6, 1890.

FIG. I.

ATTEST—
Harry L. Amer.
Chas. Schiller.

INVENTOR.
Abraham B. Landis
by E. E. Masson
atty.

(No Model.) 6 Sheets—Sheet 2.

A. B. LANDIS.
GRINDING MACHINE.

No. 427,091. Patented May 6, 1890.

ATTEST:
Harry L. Amer
Chas Schiller

INVENTOR
Abraham B. Landis
by E. E. Masson
Atty.

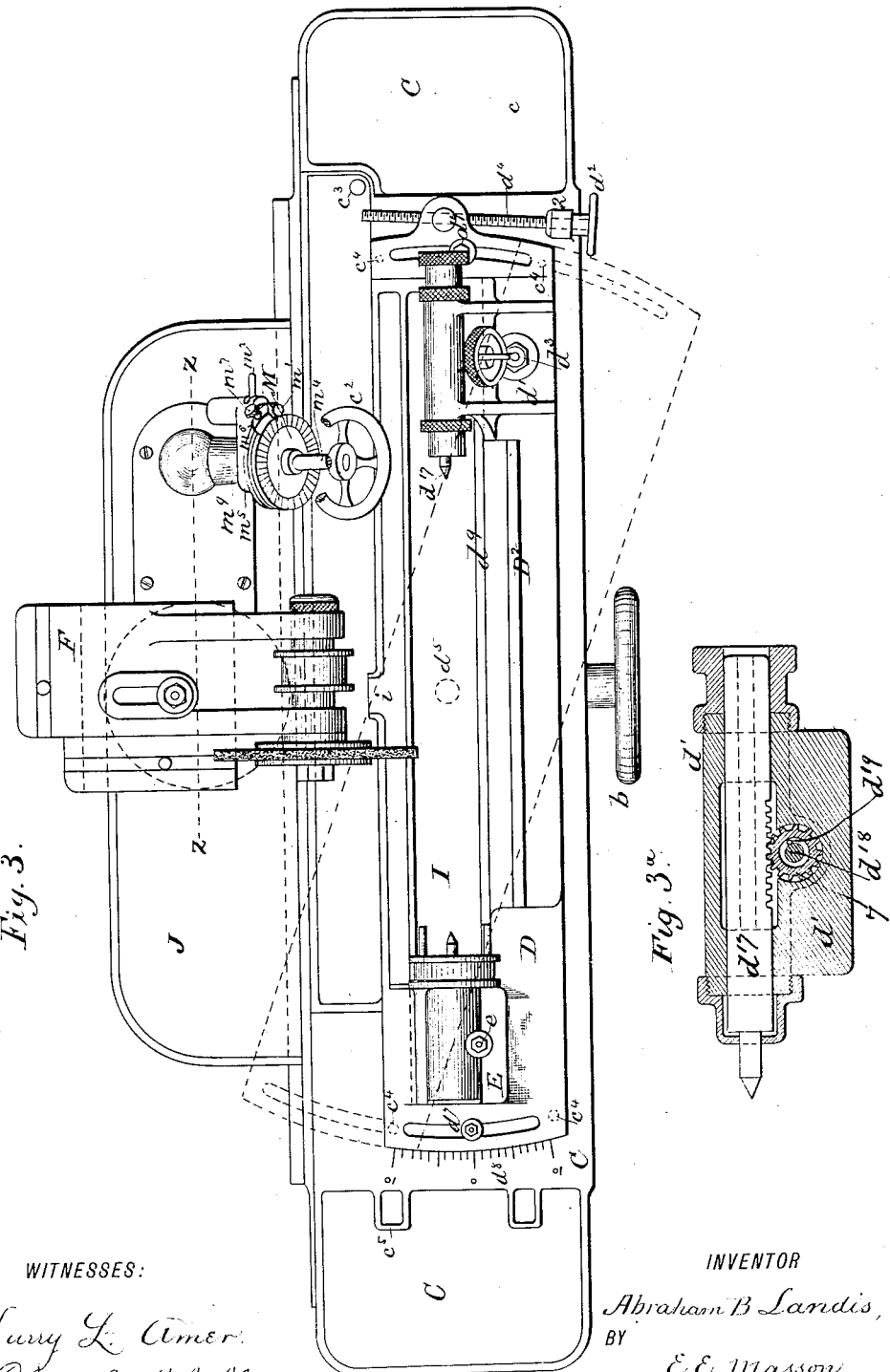

(No Model.) 6 Sheets—Sheet 4.
A. B. LANDIS.
GRINDING MACHINE.
No. 427,091. Patented May 6, 1890.
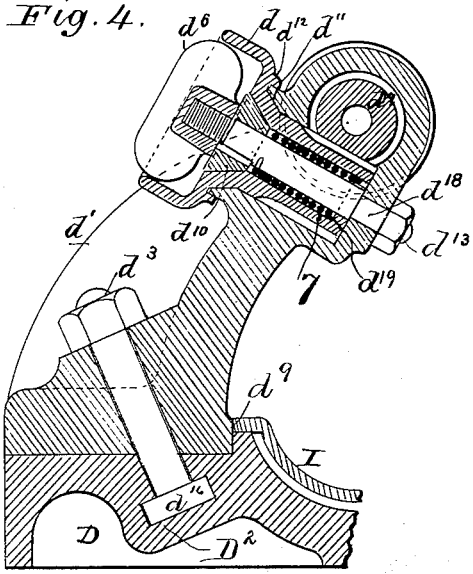
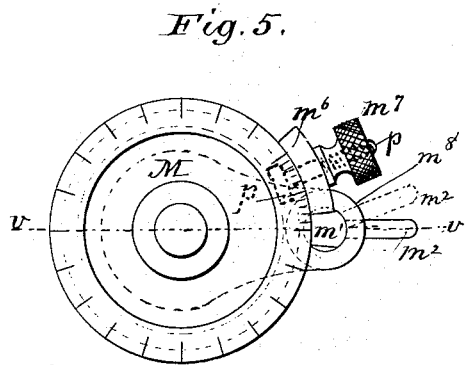
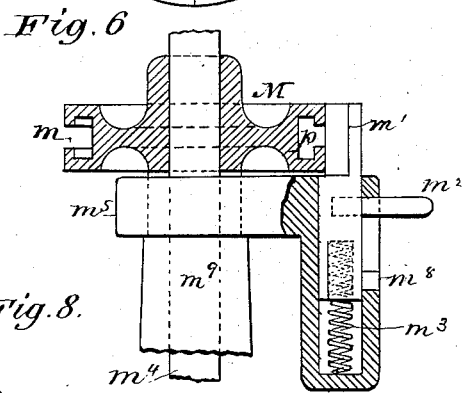
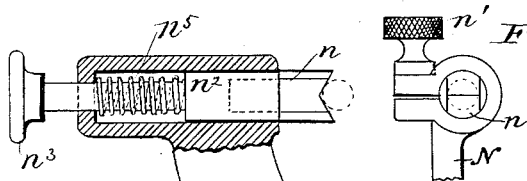
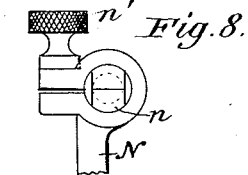
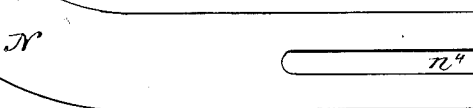
Witnesses:
H. M. Harmon
Chas. Schuller
Inventor:
Abraham B. Landis
by E. E. Masson
atty.

(No Model.) 6 Sheets—Sheet 5.

A. B. LANDIS.
GRINDING MACHINE.

No. 427,091. Patented May 6, 1890.

ATTEST-
Chas Schiller.
W. M. Harmon.

INVENTOR-
Abraham B. Landis.
by E. E. Masson,
atty.

(No Model.) 6 Sheets—Sheet 6.
A. B. LANDIS.
GRINDING MACHINE.
No. 427,091. Patented May 6, 1890.
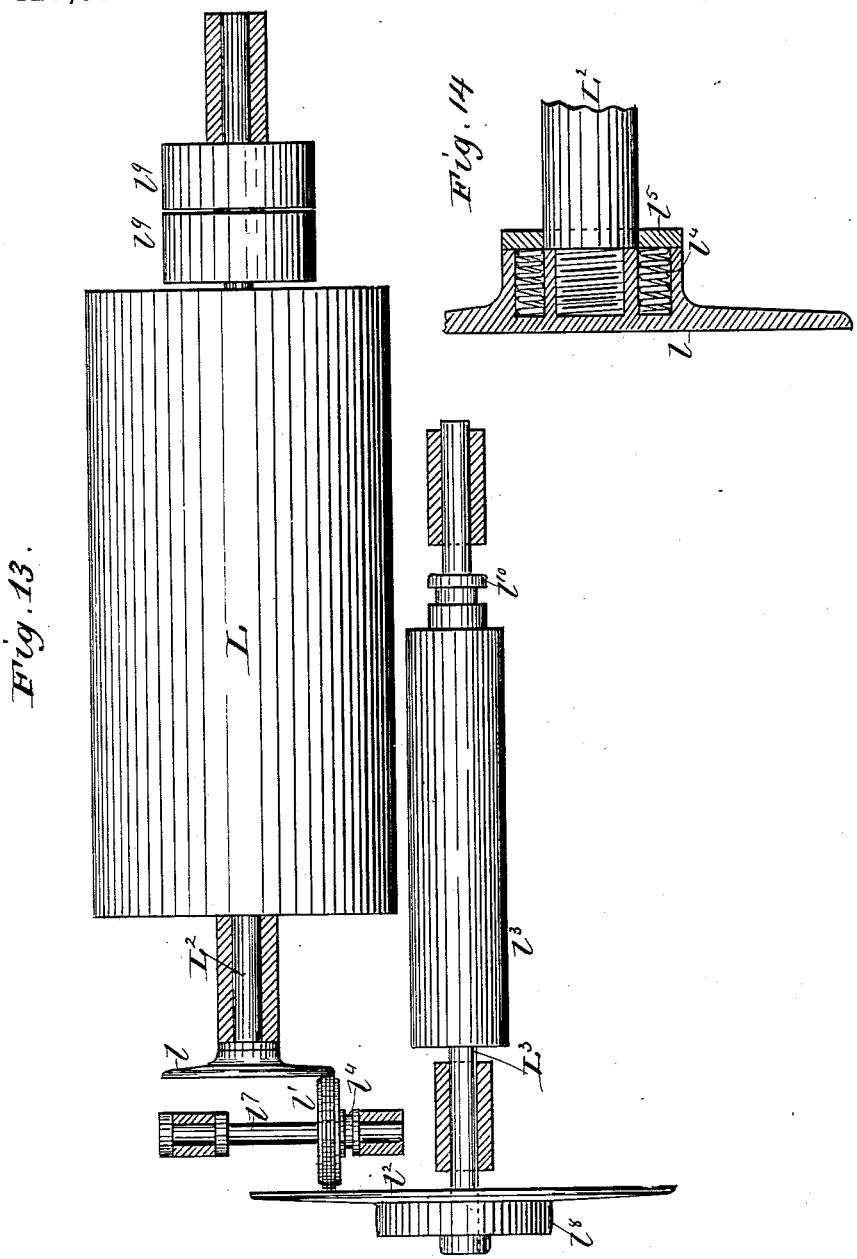
Witnesses:
Chas. Schiller,
H. M. Harmon.
Inventor:
Abraham B. Landis
by E.E. Masson
atty.

UNITED STATES PATENT OFFICE.

ABRAHAM B. LANDIS, OF WAYNESBOROUGH, PENNSYLVANIA.

GRINDING-MACHINE.

SPECIFICATION forming part of Letters Patent No. 427,091, dated May 6, 1890.

Application filed May 22, 1889. Serial No. 311,681. (No model.)

*To all whom it may concern:*

Be it known that I, ABRAHAM B. LANDIS, a citizen of the United States, residing at Waynesborough, in the county of Franklin and State of Pennsylvania, have invented certain new and useful Improvements in Grinding-Machines, of which the following is a specification, reference being had therein to the accompanying drawings.
My invention relates to universal grinding-machines adapted to do a great variety of work, as straight, tapering, and irregular work, either inside or outside; and my invention consists in the arrangement of the parts by which the relative positions of the table, the head and foot stocks, and the grinding-wheel can be adjusted, and also in the means for retaining the foot-stock adjustably secured to the table, in the pans for receiving abraded material, in the means for producing a variable traverse movement, and in other means hereinafter described, and pointed out in the claims.

Figure 1:
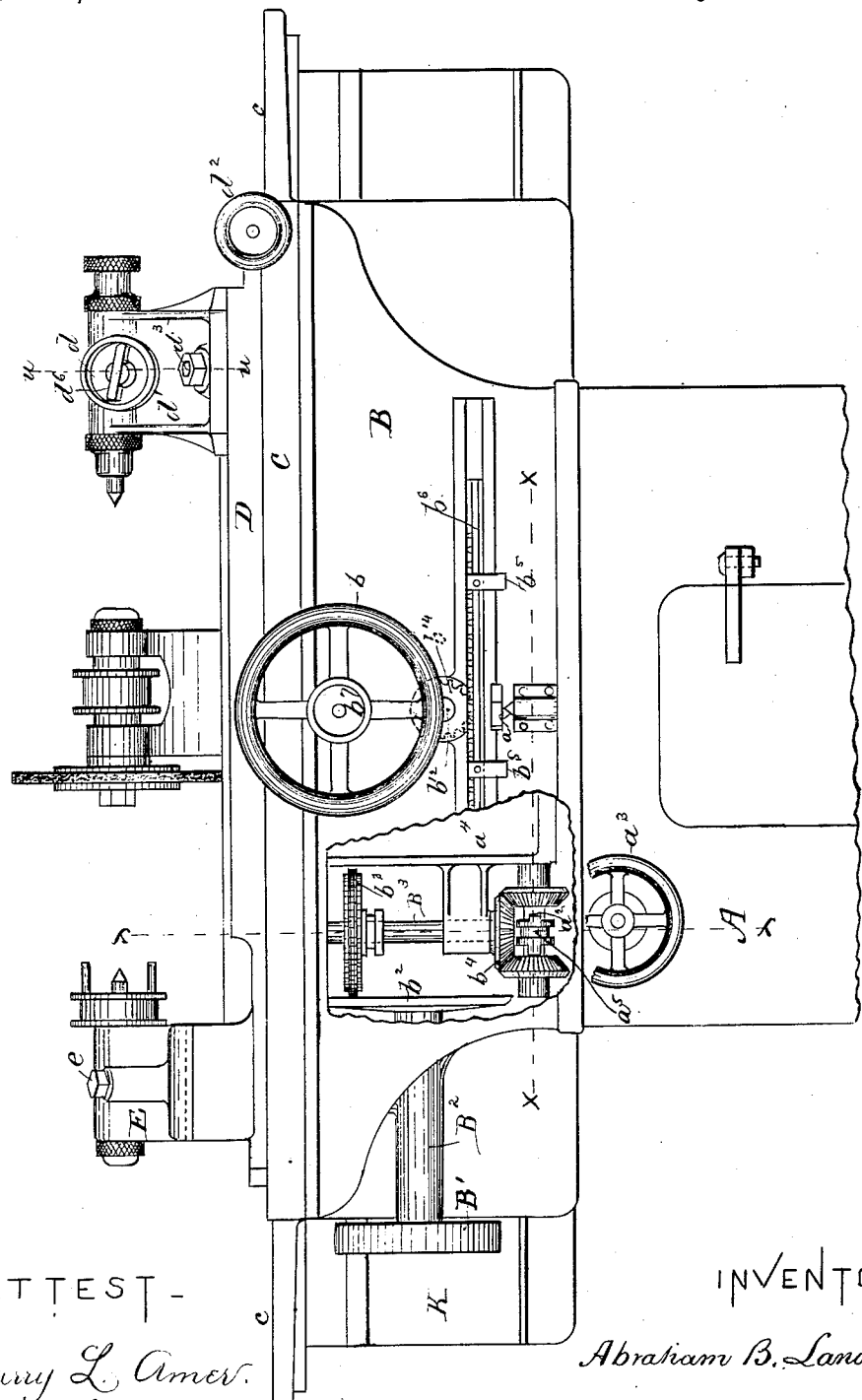
Figure 2:
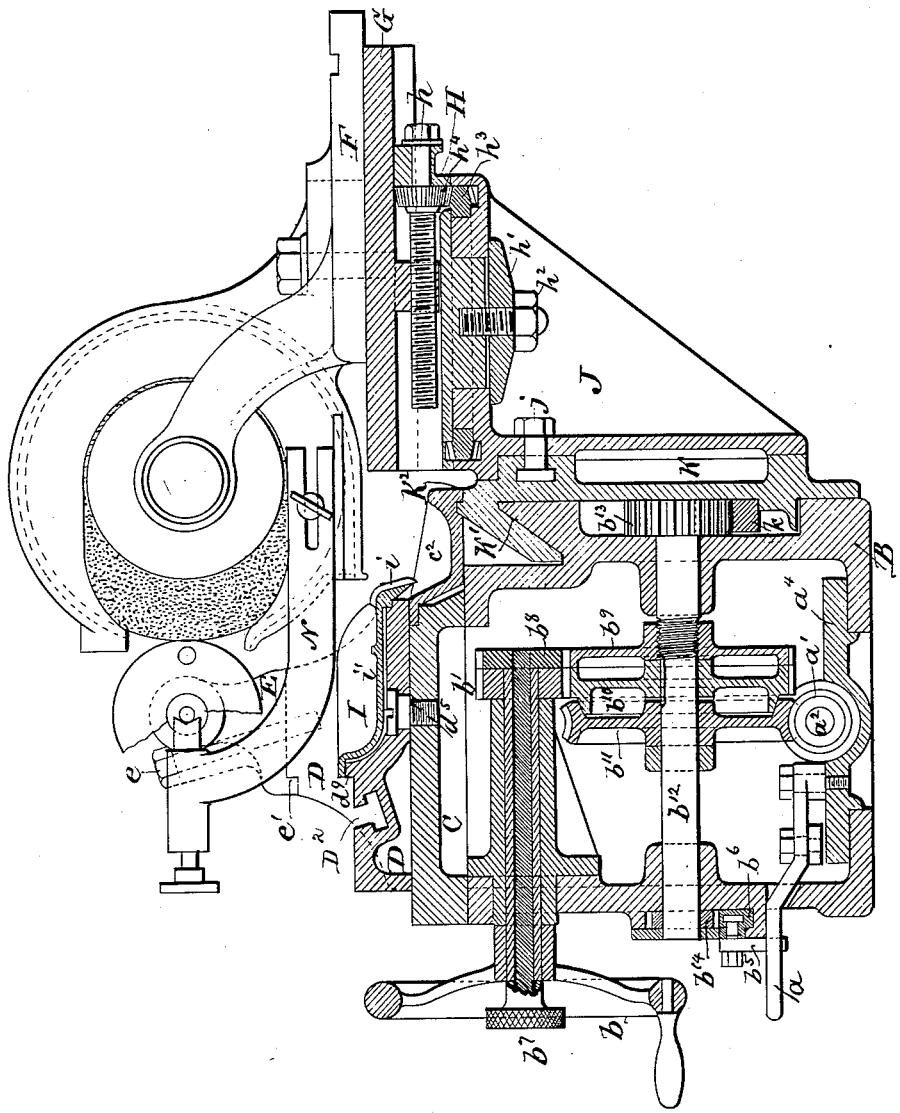
Figure 9:
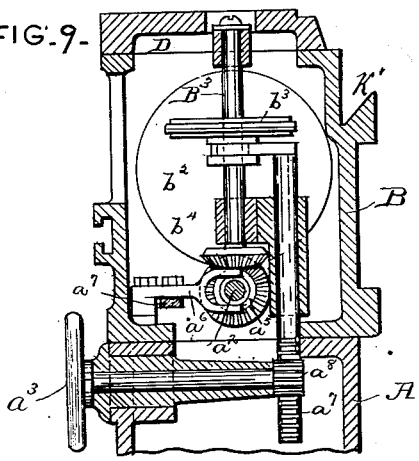
Figure 10:
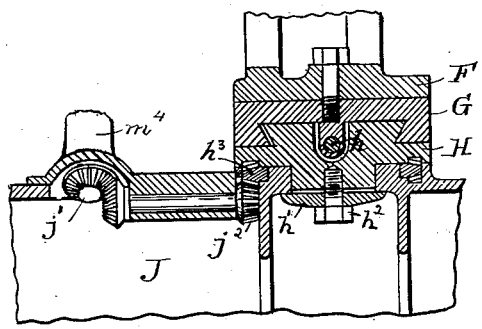
Figure 11:
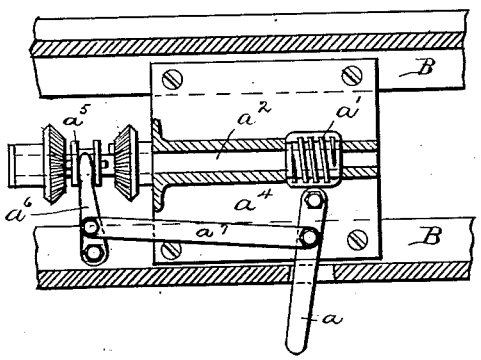
Figure 12:
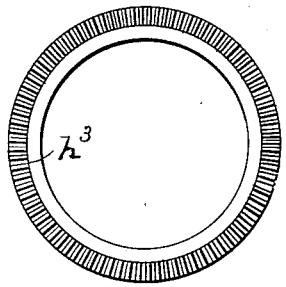

In the drawings, Figure 1 is a front view of a grinding-machine constructed in accordance with my invention. Fig. 2 is a vertical cross-section through the center of the machine. Fig. 3 is a top view of the same. Fig. 3ᵃ is a longitudinal section through the foot-stock. Fig. 4 is a central vertical cross-section of the foot-stock on line $u\ u$ of Fig. 1. Fig. 5 is a top view of a graduated disk and stop to adjust the position of the emery-wheel. Fig. 6 is a vertical section of the same on line $v\ v$ of Fig. 5. Fig. 7 is a side view, partly in section, of a follower-rest detached from the emery-wheel casing. Fig. 8 is an end view of the same. Fig. 9 is a vertical section of the grinding-machine on line $y\ y$ of Fig. 1. Fig. 10 is a longitudinal vertical section on line $z\ z$ of Fig. 3. Fig. 11 is a horizontal section on line $x\ x$ of Fig. 1. Fig. 12 is either a top or bottom view of the annular cog-wheel used to give a reciprocal movement to the emery-wheel frame and adapt it to be pivotally adjusted. Fig. 13 represents the overhead works, consisting of counter-shafts and drums and friction disks and wheels. Fig. 14 is a detail, partly in section, of the disk at the end of the shaft carrying the main drum.

The machine consists of a base A, having a bed B mounted thereon, in which are located all the feed or traverse gearing. On the top of this bed is mounted a plate C, secured to said bed B by bolts. (Not shown.) On this plate is pivoted a plate or table D, which can be swung horizontally around the central bolt $d^5$, and is secured in position by bolts $d^7$ $d^7$, passing through curved slots in the ends thereof and adjusted accurately by degrees and fractions thereof (indicated at $d^8$) by means of the screw $d^4$, which is pivoted in a bearing 2 and the hand-wheel $d^2$. Upon this pivoted plate are mounted the head and foot stocks having center-pins to revolve the work upon, the head-stock E' having a fixed position, while the foot-stock $d'$ is adjustable for different lengths of work. The foot-stock is made to overhang a pan I the entire length of its adjustment, so that all the water which drops off the shaft that is being ground will drop into this pan and run off at the spout $i$, located at the center of its length, so that it will run into the channel $c^2$ whatever may be the position of the pivoted table, thus avoiding the slopping of water over the finished parts of the machine and carrying it all away at the hole $c^3$.

The channel $c^2$ may be formed integral with the plate C, but preferably separate to avoid any action upon the plate C and the pivoted table D relatively to its center by contraction caused by water of less temperature than the bed itself. For the same reason the pan I is made separate from the pivoted table D, and an air-space is retained between them, as shown. The foot-stock $d'$ is secured to the table D by an inclined bolt $d^3$, the T-head $d^{16}$ of which is received in the groove $D^2$, which always brings it firmly against the long shoulder $d^9$, which is a true straight line of the machine, and always secures the centers in perfect alignment regardless of the position held longitudinally by the foot-stock, and this is a very important feature. The head-stock, for convenience in manufacture, is made separate and is also secured in a like manner with an inclined bolt $e$, so that it always bears firmly against the shoulder $e'$ of the table D, so that positive accurate alignment is always attained.

For angular grinding, when it is desired to move the table D to one extreme position, as shown by dotted lines in Fig. 3, and to secure it in position shown, the screw $d^2$ and its retaining-boss 2 are removed from the machine and the bolt $d^7$ is removed from its seat and inserted in one of the holes $c^4$ for either extreme to give a wide range of angle for taper work.

To adjust the grinding mechanism to the desired angle with relation to the work, I swing around the lower pivotal base H, carried by the bracket J, to any angle, according to the degrees upon the circumferential surface at the junction of these two parts. On the pivoted base H is mounted the reciprocating base G, which is operated by a screw on the under side thereof. On this base G is mounted the grinding-wheel frame F. Said frame F is adapted to be swung in any position to properly locate the wheel at any angle to the work. By revolving the base H and reciprocating the base G by the screw $h$ the direction of the grinding-wheel is shifted and a shaft can be ground at any further desired angle.

The grinding-wheel is reciprocated, as before stated, by the screw $h$. This screw is actuated by a pinion $h^4$ thereon, which engages with a cogged ring $h^3$, which turns in an annular seat in the table J, and this ring has gear-teeth on its upper side for engagement with the pinion $h^4$, and its lower side is also toothed and engages with a similar pinion $j^2$. Thus it will be seen that by swinging the base H to any angle the base G can be reciprocated at will at any angle.

The base H is held in position by clamping it with the plate $h'$ by means of the nut $h^2$ under the table J. The vertical back or bar K slides on an acute angular guide K', formed on the bed B its entire length, and is reciprocated by the pinion $b^{13}$ engaging with the rack $k$, said guide being fully protected from dirt by the joint $K^2$ between the channel $c^2$ and the bar K. The bracket J is secured adjustably to the bar K by the bolts $j$, for the purpose of changing the position of the emery-wheel and support with relation to the bar K to equalize the wear of said bar upon the guide K' in case the wheel for continued short grinding was given a short movement for a long time at one place, which would wear the guide out of a straight or true line. The traverse movement of the bar K is obtained by means of a belt passed through the holes $c^5$ in the top plate C onto the pulley B', which is mounted on a shaft running in the inside of a sleeve $B^2$, attached to the frame or bed B, said shaft having a disk $b^2$ mounted thereon, and engaging with this disk is a friction-wheel $b^3$, mounted on a vertical shaft $B^3$, having at its lower end a bevel-pinion $b^4$, gearing into two similar pinions, by which a reverse movement is obtained by means of a clutch $a^5$, mounted on the shaft $a^2$, the other end of which has a worm $a'$, engaging a wheel $b^{11}$, which is made to turn idly on the shaft $b^{12}$ until the gear-wheel $b^{10}$ (which is splined to the shaft $b^{12}$) is thrust against its internal conical bearing-surface by the wheel $b^9$, which is screwed on the shaft $b^{12}$, and said shaft turns the pinion $b^{13}$ and reciprocates the bar K. The clutch between the two bevel-gears is actuated by the lever $a$, Fig. 2, by hand or automatically by the tripping pendent lugs $b^5 b^5$, which are adjustably attached by means of a nut upon their pivots to the bar $b^6$, which has integral therewith a cog-rack on its top engaging with the pinion $b^{14}$, which is secured to the shaft $b^{12}$. The connection of said lever $a$ to the clutch-bar $a^6$ is by means of the connecting-bar $a^7$, Fig. 11. The traverse motion is started and stopped by the hand-wheel $b^7$, which operates the pinion $b^8$, and the said pinion meshes with the gear $b^9$, screwed on the shaft $b^{12}$, which gear, in revolving and advancing upon said screw, thrusts the wheel $b^{10}$ into the conical bearing-surface of the wheel $b^{11}$ and starts the feed. The reverse movement will stop it. A new feature is in the manner of drawing up this friction-clutch $b^{10}$ against $b^{11}$ by means of the narrow-faced extra gears $b^8$ and $b^9$, which permits the tightening hand-wheel $b^7$ to be located in the center of the hand feed-wheel $b$ in the most convenient position for use. The traverse feed movement is varied by moving the friction-wheel $b^3$ up and down or to and from the center of the disk $b^2$. This is accomplished by the hand-wheel $d^3$ on the front of the base A through means of a pinion $a^8$, engaging with a rack-bar $a^7$, Fig. 9, which rack-bar engages the grooved hub on the lower side of the wheel $b^3$.

$c c$ are receptacles on the end of plate C for tools, &c., within convenient reach of the operator.

The pan I thoroughly protects the pivot-screw $d^5$ from water and from the grinding material.

Fig. 4 shows a central cross-section, on an enlarged scale, of the foot-stock $d'$, showing the arrangement for manipulating its spindle $d^{17}$, which is provided with teeth on the under side for the engagement with the pinion 7, formed on the hub of the hand-wheel $d$. Said hub is bored out and receives the stud $d^{18}$ and the spring $d^{19}$, which spring has one end secured to the stud $d^{18}$ and the opposite end secured to the end of the pinion 7, and is for the purpose of rotating the pinion 7, and the latter to advance the center spindle of the foot-stock into the work under a regular tension, as the power of said spring is revolving-torsional, and said pinion is rigidly clamped in that position by the thumb-nut $d^6$, which is screwed on the outer end of stud $d^{18}$ and presses on the taper collar $d^{10}$ (which is splined onto this stud with free movement endwise) and causes friction on its taper and also on the taper $d^{11}$, formed on the hub of the hand-wheel $d$. This forms an exceedingly powerful clamp by a slight relative pressure on the thumb-screw. The spiral spring is secured to the lower end of the pinion 7, which constitutes the hub of the wheel $d$, and the upper end of the spring is secured to the stud by inserting one end of the spring therein or by any suitable means. To increase the tension, the pinion 7 is retained by means of the handle $d$, the nut $d^{13}$ is loosened, and the spring is wound by turning the stud $d^{18}$ at the upper end, and while said upper end is held by hand it is then secured again by tightening the nut $d^{13}$.

Figs. 5 and 6 represent a graduated disk M, with a peripheral slot $m$, into which the head of a screw $p$ is received, which screw enters the inner end of the hand-nut $m^7$, and the latter secures the stop-block $m^6$ on the periphery of the wheel M, and said block $m^6$ is brought to a stop against the pin $m'$, which is retained in a socketed arm $m^5$ tightly secured upon the stationary sleeve $m^9$. Each graduation represents one half-thousandth of an inch and permits an accurate setting of the emery-wheel to any size to be ground.

The special features in this device are that the pin $m'$ is adapted to be promptly removed out of the way for the passage of the stop-block $m^6$ when the wheel is to be traversed in angular grinding. This is accomplished by pressing down the pin $m'$ by the arm $m^2$, and when down it is turned to one side into the slot $m^8$ or in the position shown by dotted lines. By turning back the arm $m^2$ the spring $m^3$ will throw the pin $m'$ back into position again as a stop.

Figs. 7 and 8 represent a follower-rest to be used in connection with light straight grinding. It consists of an arm N, having a slot $n^4$ in its inner end to attach it to the emery-wheel casing (shown in Fig. 2) by a thumb-screw, so as to be quickly attached to and detached from the machine. The upper end of the arm N is bored on the same level with the centers of the machine and receives the pin $n^2$, which is bored in the end to receive the V-ended block $n$, which is preferably of wood. The other end of the pin $n^2$ protrudes and has a knob $n^3$ to draw the pin back from the work. The thumb-screw $n'$ clamps the pin in position. When in use and the work is reduced in size, the screw $n'$ is simply slacked, which allows the spring $n^5$ to gently press the pin with its end block against the work, and the screw $n'$ securely holds it. It is quite necessary that only a light pressure be brought on the work of light character, and a light spring best accomplishes this and is better than a hand adjustment, which is more uncertain.

Fig. 16 shows the overhead works, consisting of a drum L, mounted upon a shaft $L^2$, having tight and loose pulleys $l^9$ $l^9$. From this drum the grinding-wheel arbor is driven by means of a belt. (Not shown.) On the end of this driving-shaft is a disk $l$, which engages with a friction-wheel $l'$, mounted on a shaft $l^7$, and this wheel $l'$ engages with the disk $l^2$, mounted on the shaft $L^3$, and upon said shaft is the drum $l^3$, whic drives the head-stock by means of a belt, both for straight and for face grinding. Pulley $l^8$, formed, preferably, on the disk $l^2$, drives the traverse mechanism by means of a belt passing around the pulley $b'$. To stop and start the work, the shaft $L^3$, carrying the disk $l^2$, is moved endwise, and thereby the said disk becomes disconnected from the friction-wheel $l'$. This is accomplished by means of a lever applied to the groove in the collar $l^{10}$ on said shaft. This stops the traverse motion and the revolving of the work, while the grinding-wheel continues to rotate. This is done to measure or caliper the work, and can be done more quickly than by stopping the high-motion grinding-wheel. The contact between the disk $l$ and the wheel $l'$ is constant, and is accomplished, as shown in Fig. 17, by the springs $l^4$, placed in recesses in the hub of disk $l$, and they bear against the washer $l^5$, which presses against box $l^{11}$ and holds the disk and wheels in contact. This arrangement does away with all cross-belts heretofore used on this class of machines, and gives the additional advantage of a thorough variable motion by moving the wheel $l'$ back and forth by a lever engaging with the groove in the collar $l^6$, and said lever can extend below within convenient reach of the operator.

Having now fully described my invention, I claim—

1. In a grinding-machine, the combination of the table D, pivotally secured to the top plate C and having a longitudinal groove in the top thereof, and a long shoulder $d^9$, with a foot-stock, and a bolt having its head inserted in said longitudinal groove and passing through the foot-stock in a direction inclined to the top of said table, substantially as and for the purpose described.

2. In a grinding-machine, the combination of the table D, pivotally secured to the top plate C and having a longitudinal groove $D^4$ in the top thereof on the outside of a vertical plane passing through the axis of the head and foot stocks, with a foot-stock having its base over said groove and on one side of said vertical plane, substantially as and for the purpose described.

3. In a grinding-machine, the combination of the bed B, having an acute angular guide K' the length thereof, the back bar K, hooked thereon, the bracket-table J, longitudinally adjustable upon the bar K, and secured thereto, the emery-wheel, and the emery-wheel base-frame F, adjustably secured to said bracket-table, substantially as described.

4. The combination of the pulley B', its shaft and friction-disk $b^2$, the friction-wheel $b^3$ on the vertical shaft $B^3$, a bevel-pinion $b^4$ upon said shaft, two pinions gearing with said bevel-pinion, a clutch $a^5$ upon a shaft having a worm $a'$, the wheel $b^{11}$, engaging with said worm, and gear $b^{10}$, splined upon the same shaft and having a frictional surface, substantially as and for the purpose described.

5. In a grinding-machine, the combination of the bed B, having an acute angular guide K′ the length thereof, the back bar K, hooked thereon, and its rack, a pinion engaging with said rack, its screw-threaded shaft, the gear-wheel $b^9$ upon the screw-threaded portion of said shaft, the pinion $b^8$, the friction-gear $b^{10}$, the pinion $b′$ and its hollow shaft, and the shaft of the pinion $b^8$, passing through the hollow shaft carrying the hand-wheel $b$, substantially as described.

6. In a grinding-machine, the combination of a table, the foot-stock adjustably secured thereto, the spindle having rack-teeth, the hollow handle having upon its hub cogs to engage with said spindle, and an integral conical bearing, the stud within said hub having a conical collar and a coil-spring, and a handle for said stud, substantially as described.

7. The combination of the grinding-wheel frame, the cogged ring, and beveled pinion with the inclined shaft $m^4$, the graduated disk M, having the peripheral slot $m$, the pin $m′$, and stop-block $m^6$ against the periphery of said disk, substantially as and for the purpose described.

8. The follower-rest N, having its lower end slotted and its upper end tubular, in combination with the pin $n^2$, having a shouldered stem and a coiled spring and knob thereon, a block within the hollow end of said pin, a clamp, and a fastening-screw $n′$, said rest N being secured to a grinding-wheel frame, substantially as described.

9. The combination, with a grinding-wheel revolving frame and means, as described, to rotate it, of a shaft $m^4$, having a graduated disk M, provided with the peripheral slot $m$, with the stop-block $m^6$, secured to the periphery of said disk, with the stop-pin $m′$, seated in a casting $m^5$ and having a spring $m^3$ at its lower end, and a pin $m^2$, inserted in said pin $m′$ to engage with the lateral slot $m^8$, substantially as and for the purpose described.

10. The combination, with a grinding-wheel revolving frame and means, as described, to rotate it, of the screw-shaft $b^{12}$, the gear-wheel $b^9$ upon the screw-threaded portion, the pinion $b^8$, the friction-gear $b^{10}$ and its pinion $b′$, and the shaft of the pinion $b′$, passing through the shaft carrying the hand-wheel $b$, substantially as described.

In testimony whereof I affix my signature in presence of two witnesses.

ABRAHAM B. LANDIS.

Witnesses:
ALF. N. RUSSELL,
JNO. B. RUSSELL.